O. G. MANDT.
DUMPING WAGON AND THE LIKE.
APPLICATION FILED APR. 25, 1921.
1,411,794.
Patented Apr. 4, 1922.
2 SHEETS—SHEET 2.
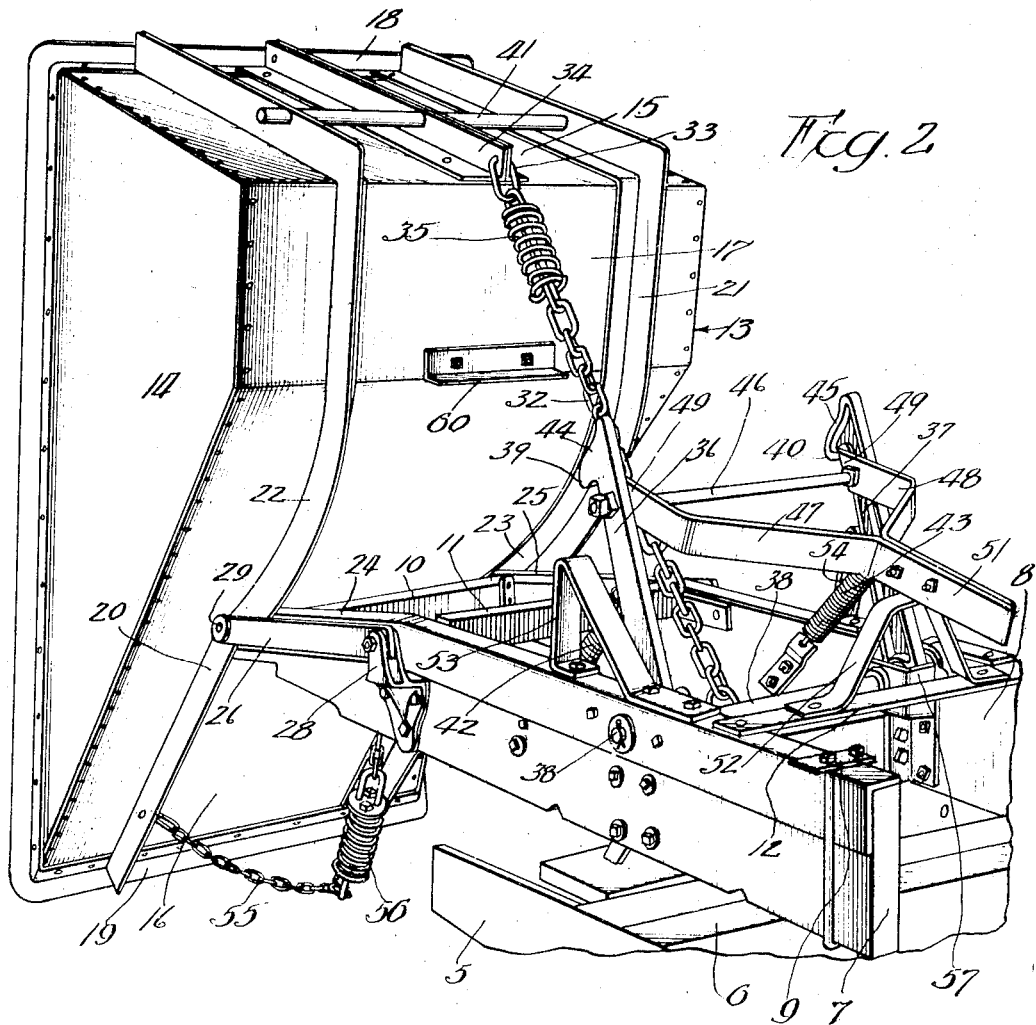
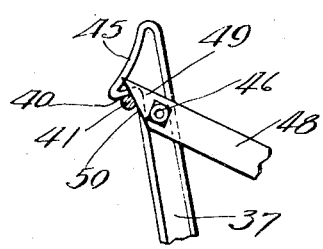
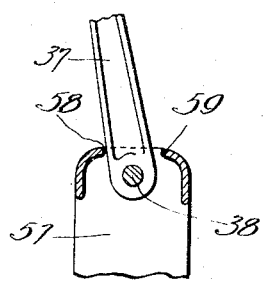
Inventor;
Obert G. Mandt

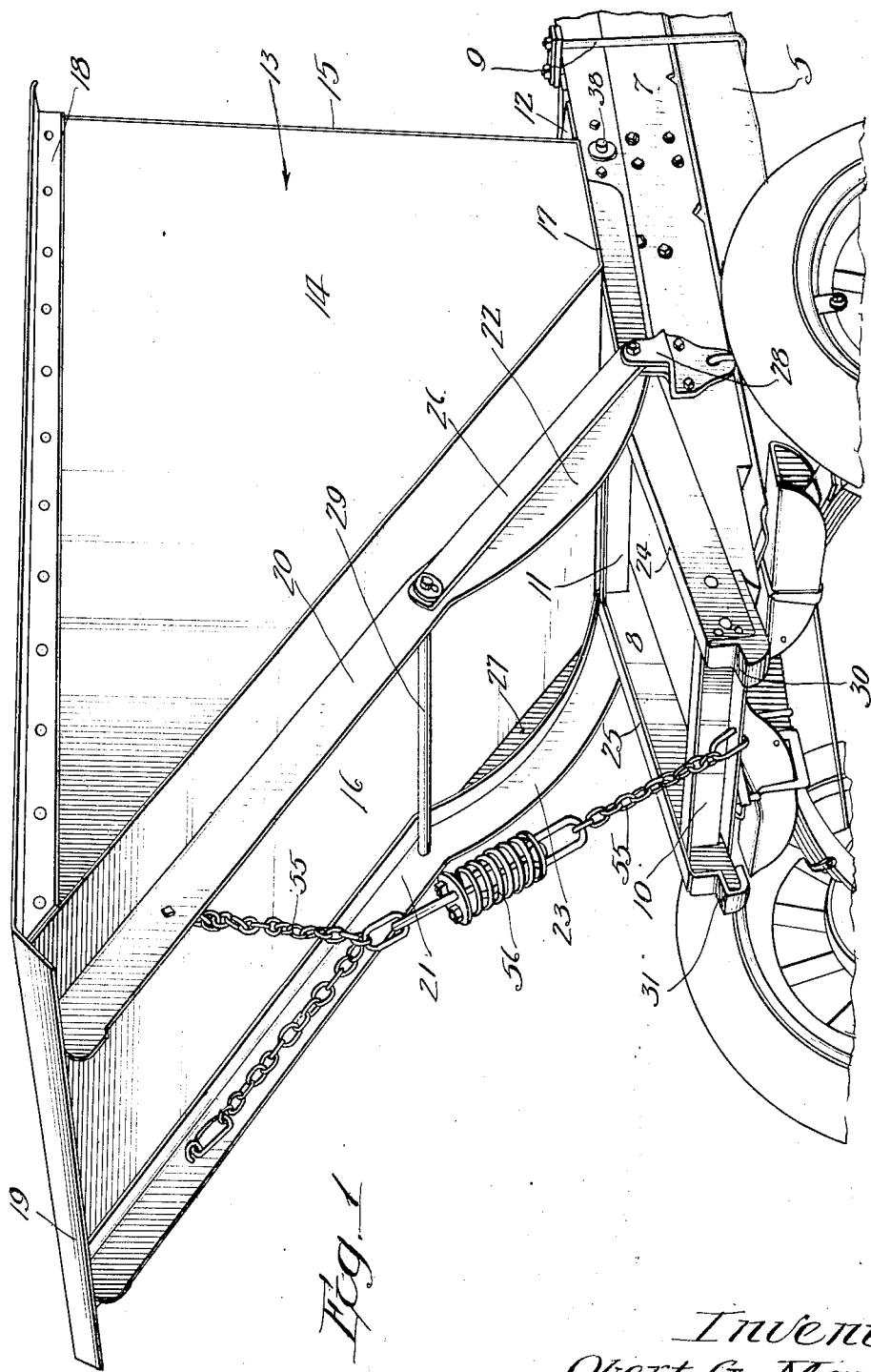

UNITED STATES PATENT OFFICE.

OBERT G. MANDT, OF KEOKUK, IOWA.

DUMPING WAGON AND THE LIKE.

1,411,794.  Specification of Letters Patent.  Patented Apr. 4, 1922.

Application filed April 25, 1921. Serial No. 464,409.

*To all whom it may concern:*

Be it known that I, OBERT G. MANDT, a citizen of the United States, residing at Keokuk, in the county of Lee and State of Iowa, have invented certain new and useful Improvements in Dumping Wagons and the like, of which the following is a specification.

This invention has to do with certain improvements in wagons having dumping bodies whereby the contained material may be easily discharged by tilting the body backwardly. One of the objects of this invention is to provide an improved supporting means for the dumping body for supporting the same on the chassis or frame of the wagon or truck. In this connection, an object is to provide a very stable and rigid form of support for the hopper or dumping element.

Another feature of the invention relates to the manner of supporting the hopper and compelling it to travel between fixed points with respect to the chassis in the dumping and restoring operations. In this connection, an object of the invention is to make provision for positively limiting the amount of travel of the hopper in the dumping direction, and also for connecting the hopper to the chassis by means of a link arrangement which will be positively operative at all times.

Another feature of the invention relates to the locking mechanism whereby the hopper is locked to the chassis in the carrying position. Another object is to provide a very positive locking arrangement, but at the same time to provide a locking arrangement which may be very readily disengaged by the operator with the application of a relatively small amount of force.

Other objects and uses of the invention will appear from a detailed description of the same, which consists in the features of construction and combinations of parts hereinafter described and claimed.

In the drawings:

Figure 1 shows a perspective back view of the rear portion of a chassis having applied thereto a hopper and connections embodying the features of the present invention, the hopper being in the raised or carrying position;

Fig. 2 shows a perspective view taken at right angles to Fig. 1, the hopper having been released and tilted backwardly into the dumping position;

Fig. 3 shows a fragmentary detail view of the upper portion of one of the hooks and the releasing finger; and Fig. 4 shows a detailed fragmentary view of the lower portion of one of the hooks.

For purposes of convenience I have illustrated the hopper and related parts of the present invention as being mounted upon a chassis including side frames 5 and a cross beam 6. The extension arms 7 and 8 are secured to the side bars 5 by means of clips 9. These extension arms 7 and 8 are joined together by an end bar 10 and other transverse pieces such as 11 and 12 so as to provide a rigid extension frame.

The hopper is designated in its entirety by the numeral 13. It has the relatively triangular side 14, the front 15 and the sloping back 16. In some cases the hopper will also be provided with a relatively short bottom piece 17 as illustrated in the drawings. In the particular construction illustrated the front, back, and bottom pieces are integral, consisting of a sheet bent into the proper shape and riveted to the turned over edge portions of the sides 14.

When the hopper stands in the vertical position of Fig. 1, it is in a condition of relative instability on account of the long overhang of the back portion. Consequently, the hopper when normally filled tends to tilt over backward and discharge its contents as will be clear from examination of Fig. 2.

Around the top portion of the hopper is placed an angle reinforcement and finishing bar 18. The horizontal leg of the back portion of this bar is bent down to provide the lip 19 as clearly shown particularly in Fig. 1.

Extending lengthwise of the hopper are the two rail members 20 and 21. Each of these consists of a section of angle bar having its horizontal leg lying over and against the hopper and its vertical leg extending downwardly. If desired, these bars may be extended up along the front side of the hopper so as to reinforce the same as shown in Fig. 2.

The hopper rides back and forth along the rear portion of the extension frame, and particularly the rear portions of the side bars 7 and 8. For this purpose the rail members 20 and 21 are preferably curved as shown in the figures in the portions 22 and 23 which travel on the rails 7 and 8 so as to facilitate the tilting movement of the hopper, and so as to cause the hopper to travel rearwardly as it is tilted. This will tend to throw the contents of the hopper backwardly, thus improving the discharging action, and will also cause the hopper to more effectively clear the rear end of the chassis in the dumping action.

The curved portions 22 and 23 of the rail members travel on the side bars 7 and 8. The downwardly depending flanges of these rail members serve as guides to prevent any lateral movement of the hopper either when in the raised position or during the dumping operation.

I prefer to slope the rear portions of the side bars 7 and 8 downwardly as shown at 24 and 25 so as to assist the dumping action. I also prefer to face the top and side portions of the side bars 7 and 8 with angles as clearly indicated particularly in Fig. 2.

I provide a pair of links 26 and 27 which connect the rail members 20 and 21 with the side bars 7 and 8. For this purpose I provide the brackets 28 on the side bars to which the inner ends of the links are connected; and the outer ends of the links are pivoted on the cross rod 29 which extends through the rail members 20 and 21. This cross bar 29 is so positioned that it will just reach the rear ends of the side bars 7 and 8 when the hopper is fully tilted, at which time the bar 29 will engage the shoulders 30 and 31 on the rear ends of the side bars 7 and 8. This will support the hopper in the fully dumped position and will prevent it from over riding. At the same time the hopper when in this position may pivot on the cross bar 29 so as to improve the dumping action and ensure a complete dumping operation.

In order to prevent the hopper from turning clear over when in the dumping position, I provide a stop chain or the like 32 having its inner end connected to the chassis frame or to the extension frame and having its outer end 33 connected to the back portion of the hopper. A pair of reinforcing angle bars 34 on the back of the hopper provide a convenient element to which is connected the end 33. A spring 35 may be placed in the chain so as to take up the shock and give a certain amount of jerking action to the hopper at the instant of discharge.

Pivoted to the extension frame is a pair of side hooks 36 and 37, whose lower ends are pivoted on a cross bar 38 which extends between the side bars 7 and 8. The upper ends of the hooks 36 and 37 are provided with the latches 39 and 40 which are adapted to engage a cross bar 41 on the back portion of the hopper when the hopper is restored to the normal carrying position. Springs 42 and 43 are provided for drawing the hooks to the rear and into the locking position. The upper portions of the hooks are provided with the cam faces 44 and 45, so that when the hopper is thrown into the carrying position the bar 41 will be forced past the hooks and cause the hopper to lock.

Extending between the upper portions of the hooks is a cross bar 46 on which are pivoted one or more arms 47 and 48. The inner ends 49 of these arms are provided with cam faces 50, as clearly shown in Fig. 3, so that when the arms 47 and 48 are raised said cam faces will force the arms 47 and 48 forward and cause them to disengage from the cross bar 41. The front ends of the arms 47 and 48 may be drawn together as shown in Fig. 2, so as to provide a handle 51 by means of which they may be conveniently manipulated. This handle normally rests on a bracket 52 carried by the extension frame.

A pair of brackets 53 and 54 are mounted on the extension frame to engage the back face of the hopper when it is in carrying position, and so as to assist in keeping the hopper properly positioned on the machine.

A rear chain 55 may be provided for joining the rear ends of the rail members to the cross bar 10 of the extension frame, and said chain may be provided with a spring 56 by means of which a certain amount of tension is also exerted on the chain when the hopper is in the carrying position. This tension, when used, will assist in throwing the hopper into the dumping position when the hooks are released.

The lower portions of the hooks 36 and 37 are carried in brackets 57 such as are shown in detail in Fig. 4. Each of these brackets has a slotted upper end which accommodates the lower end of the hook, said slotted upper end providing the stops 58 and 59 for limiting the swing of the hook. If desired, an angle stop 60 may be placed on the bottom of the hopper in position to engage one of the cross members of the extension frame when the hopper is in the carrying position.

I wish to point out particularly the fact that the links 26 and 27 are made of such length as to absolutely limit the backward movement of the hopper in the dumping operation, and they also serve to positively ensure the proper riding of the hopper on the extension frame at all times. They are therefore to be distinguished from hooks and pins which simply serve to position the hopper at the extreme limits of its movement, since such hooks and pins when used do not always come into proper engagement.

While I have herein shown and described only a single embodiment of my invention, still I do not limit myself to the same except as I may do so in the claim.

I claim:

In a machine of the class described, the combination of a track, a hopper working on and supported by said track, suitable guides for guiding the hopper in its movements on the track, a pin on the front face of the hopper, a hook pivotally mounted in front of the hopper and adapted to engage said pin when the hopper is in the raised position, a lever pivoted on the upper end of the hook, and a cam face on the lever adapted to engage the pin for the purpose of forcing the pin away from the hook when the lever is rocked with respect to the hook, substantially as described.

OBERT G. MANDT.